(12) United States Patent
Dunn Berger et al.

(10) Patent No.: US 8,539,190 B2
(45) Date of Patent: Sep. 17, 2013

(54) PREEMPTIVE IN-PIPELINE STORE COMPARE RESOLUTION

(75) Inventors: Deanna Postles Dunn Berger, S. Hyde Park, NY (US); Michael Fee, Cold Spring, NY (US); Robert J. Sonnelitter, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/459,598

(22) Filed: Apr. 30, 2012

(65) Prior Publication Data

US 2012/0215995 A1  Aug. 23, 2012

Related U.S. Application Data

(63) Continuation of application No. 12/822,734, filed on Jun. 24, 2010, now Pat. No. 8,407,442.

(51) Int. Cl.
  *G06F 12/00* (2006.01)
  *G06F 13/00* (2006.01)
  *G06F 13/28* (2006.01)
  *G06F 9/30* (2006.01)
  *G06F 9/40* (2006.01)
  *G06F 15/00* (2006.01)

(52) U.S. Cl.
USPC .......... 711/168; 711/150; 711/158; 712/205; 712/216

(58) Field of Classification Search
USPC .................. 711/150, 158, 168; 712/205, 216
See application file for complete search history.

(56) References Cited

U.S. PATENT DOCUMENTS

| | | | |
|---|---|---|---|
| 6,877,077 B2* | 4/2005 | McGee et al. | 711/158 |
| 2005/0220239 A1* | 10/2005 | Sigurdsson et al. | 375/372 |
| 2009/0157943 A1 | 6/2009 | Robinson | |
| 2010/0146248 A1* | 6/2010 | Mayer et al. | 712/237 |

* cited by examiner

*Primary Examiner* — Ryan Bertram
(74) *Attorney, Agent, or Firm* — Cantor Colburn LLP; John Campbell

(57) ABSTRACT

A computer-implemented method that includes receiving a plurality of stores in a store queue, via a processor, comparing a fetch request against the store queue to search for a target store having a same memory address as the fetch request, determining whether the target store is ahead of the fetch request in a same pipeline, and processing the fetch request when it is determined that the target store is ahead of the fetch request.

19 Claims, 5 Drawing Sheets

PREEMPTIVE IN-PIPELINE STORE COMPARE RESOLUTION

CROSS-REFERENCE TO RELATED APPLICATION

This application is a continuation of U.S. patent application Ser. No. 12/822,734, filed Jun. 24, 2010, the content of which is hereby incorporated by reference in its entirety.

BACKGROUND

The present invention relates to improved data processing method, and more specifically, to method for providing preemptive in-pipeline store compare resolution during data processing.

In a computer system, the processor (CPU) executes instructions of a program. Typically, execution of instructions involves fetching (e.g., loading) and reading data into registers from memory (e.g., a cache), performing operations on the data, and storing and writing the results of the operations to memory, for example. Sometimes there may be latency due to a fetch and store simultaneously attempting to access a cache during a same processor cycle, for example, where a store has to wait for the fetch request to access the cache. Other times, the fetch must wait for the store to update the cache, otherwise the fetch may retrieve old data from a shared cache. Due to the nature of the shared cache pipeline, the target store that the fetch is waiting for could actually be ahead of the fetch in the pipeline. The fetch still must detect the store because if it missed seeing a store that is close ahead of it in the pipeline the fetch may retrieve old data from the shared cache or the fetch may stall because not seeing the missed store causes it to become stuck in a state waiting for a store that never comes. One method involves having a fetch request set a wait for the store, and then to look ahead for the store in the shared pipeline and reset the wait if it sees the store. However, this method results in added latency due to the fetch request having to set a wait for a few processor execution cycles for a store that may have already accessed the shared cache. This method also results in increase in area and power usage due to the replication of the logic in many fetch requests.

SUMMARY

According to an embodiment of the present invention, a computer-implemented method is provided. The computer-implemented method includes receiving a plurality of stores in a store queue, via a processor, comparing a fetch request against the store queue to search for a target store having a same memory address as the fetch request, determining whether the target store is ahead of the fetch request in a same pipeline, and processing the fetch request when it is determined that the target store is ahead of the fetch request.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention disclose a method of "looking ahead" in a pipeline to determine whether a target store is ahead of a fetch request in order to avoid unnecessary latencies and reduce power consumption.

Figure 1:
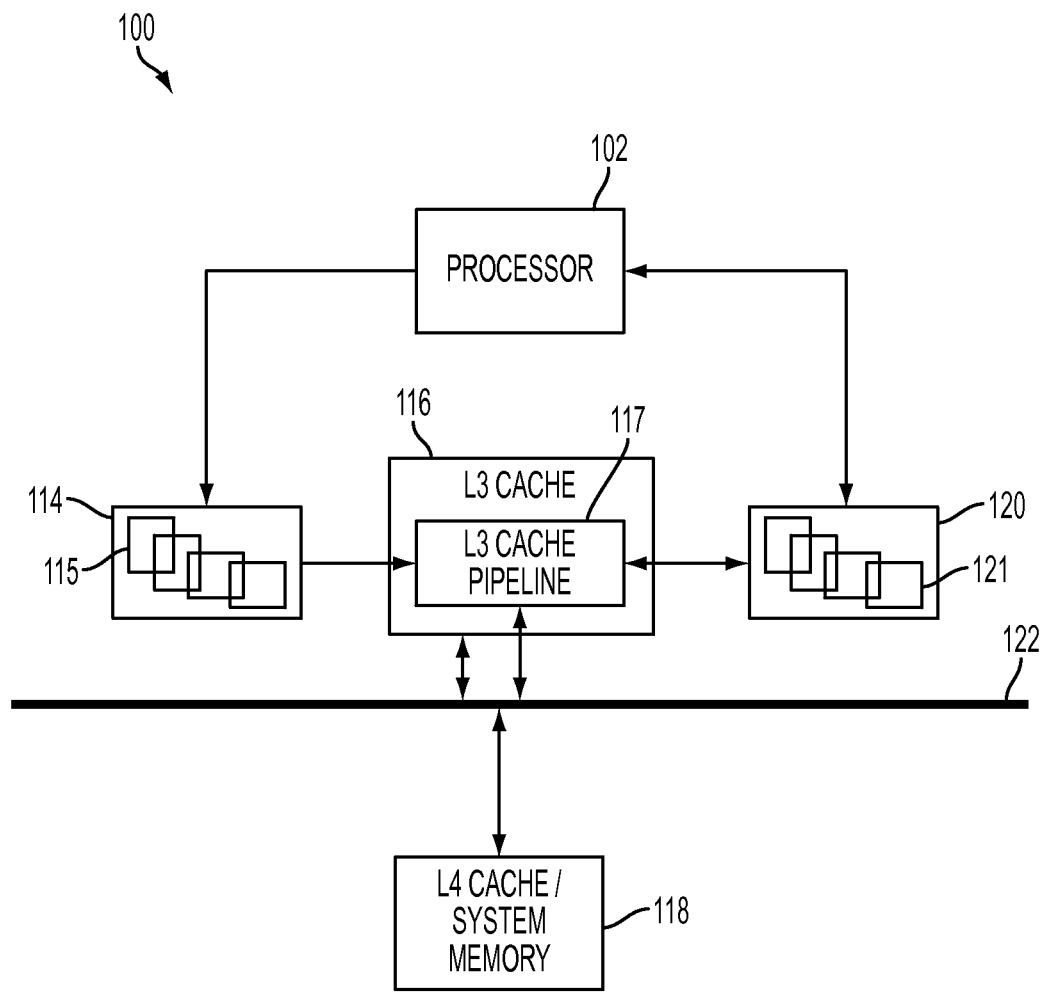
FIG. 1 is a block diagram illustrating a computer system that can be implemented within embodiments of the present invention.

FIG. 1 is a computer system 100 including a processor circuit 102, a store queue 114 and L3 cache 116, a fetch queue 120, a system bus 122 and a L4 cache/system memory 118. The L3 cache includes a pipeline 117. The processor circuit 102 reads and writes from the cache 116 or 118.

The store queue 114 stores a plurality of stores 115 while the fetch queue 120 stores a plurality of fetch requests 121. The plurality of stores 115 within the store queue 114 are typically processed in order. According to an embodiment of the present invention, when a fetch request 121 makes a pipe pass to the pipeline 117, the store queue 114 which includes compare logic, performs a compare of the memory address of the fetch request with that of the plurality of stores 115 within the store queue 114 and when it determines that one of the stores 115 has the same memory address as that of the fetch request 121, the store queue 114 returns a pointer value of that target store 115. According to an embodiment of the present invention, it is also determined whether a target store of the plurality of stores 115 is ahead of the fetch request 121 in a same pipeline 117 as depicted in FIG. 1.

According to an embodiment of the present invention, the earliest pointer release timing of the store queue compare is able to be determined in order to prevent unnecessary delays regarding processing the fetch request as discussed below with reference to FIGS. 2 through 4.

Figure 2:
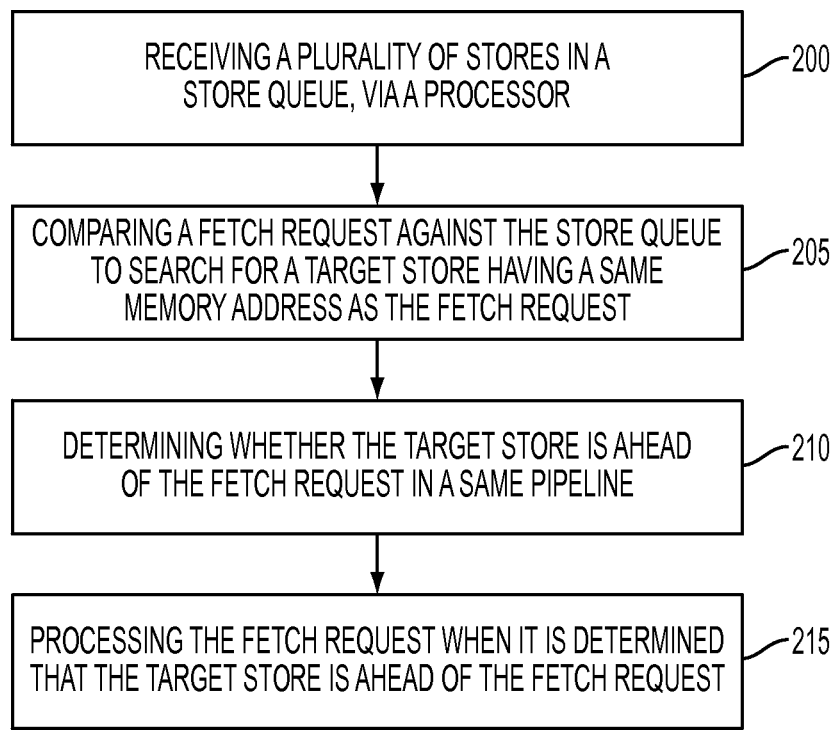
FIG. 2 is a flowchart illustrating a computer-implemented method for processing a fetch request that can be implemented within embodiments of the present invention.

FIG. 2 is a flowchart illustrating a computer-implemented method for processing a fetch request that can be implemented within embodiments of the present invention. As shown in operation 200, a plurality of stores (as depicted in FIG. 1) are received in a store queue via a processor. From operation 200, the process continues to operation 205, where a fetch request is compared against the store queue to search for a target store having a same memory address as the fetch request. From operation 205, the process continues to operation 210, where it is determined whether the target store is ahead of the fetch request in a same pipeline 117 (as depicted in FIG. 1). If it is determined that the target store is ahead of the fetch request in the same pipeline then the process continues to operation 215 processing the fetch request.

According to an embodiment of the present invention, operation 210 is performed by evaluating the pipe cycles of the target store compared to the pipe cycles of the fetch request and determining the earliest store queue compare pointer release timing. FIG. 3 is timing diagram illustrating timing of store queue compare release that can be implemented within embodiments of the present invention; while FIG. 4 is chart illustrating examples of pipe cycles for target stores versus pipe cycles for fetch request that can be implemented within embodiments of the present invention.

Figure 3:
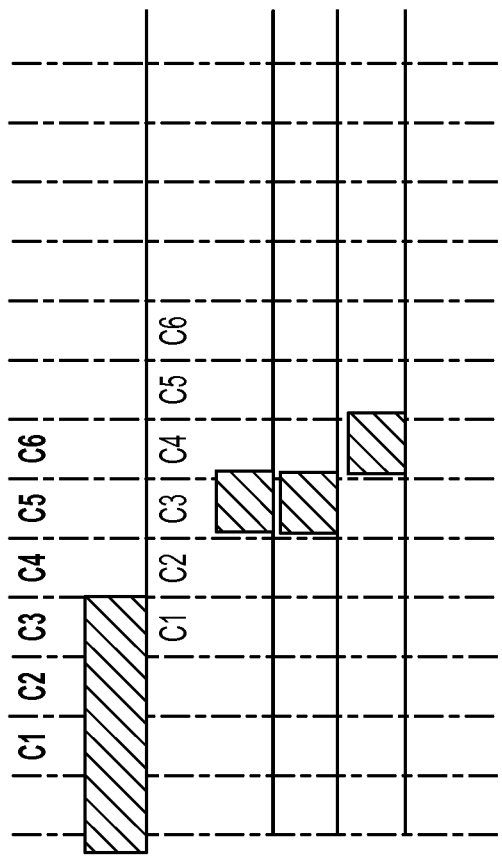
FIG. 3 is timing diagram illustrating timing of store queue compare release that can be implemented within embodiments of the present invention.

FIG. 3 shows the pipe cycles of the target store which are C1, C2, C3, C4, C5 and C6 along with the fetch request pipe cycles which are C1, C2, C3, C4, C5, and C6. According to an embodiment of the present invention, the pipe cycles of the fetch request are ahead of the pipe cycles of the target store such that the third pipe cycle C3 of the target store is aligned with the first pipe cycle (C1) of the fetch request. According to an embodiment of the present invention, it is determined whether the target store is ahead of the fetch request (in operation 210) by comparing a pointer of the target store obtained by the fetch request at a third pipe cycle (C3) of the fetch request to a pointer of the target store at the fifth pipe cycle (C5) of the target store ahead of the pipe cycle (C3) of the fetch request, to determine whether the store has completed. If the store has completed its pass, a target store valid for compare signal is reset during the third pipe cycle (C3) of the store. Once the valid for compare signal is reset, compares against that store will no longer be reported to fetches. If it is determined that there is a match at the third pipe cycle (C3) of the fetch request (i.e., the earliest pointer match cycle), central logic within the processor blocks reporting of the store queue compare needs to a controller of the fetch queue. On the other hand, if its not a match, then a wait need is set at the fourth pipe cycle (C4) of the fetch request (i.e., the fetch needs set cycle shown in FIG. 2) and a fetch controller (not shown) will wait until it detects its matching store in the pipeline.

According to an embodiment of the present invention, the same compare process may be performed between the pointer of the target store at the third pipe cycle (C3) of the fetch request and that of the target store at the fourth pipe cycle (C4) of the target store, for example.

Further, according to an embodiment of the present invention, depending on which pipe cycle fetches access the cache in relation to which cycle the stores access the cache, the fetch request may be processed and data may be returned on the same pipe pass, thereby eliminating a need for another pass before returning the fetch data. In other embodiments the timing between a fetch cache access and a store cache write (i.e. store done very late in the pipeline and fetch done very early) is such that the fetch data return is not possible on the current pipe pass even if the target store was ahead of the fetch in the pipe. In these cases the invention comparison may be additionally performed at pipe cycle C6 as well as pipe cycles C4 and C5 of the target store to detect that the store is not completed in time to begin the fetch, triggering a fetch cancel and pipe recycle.

Figure 4:
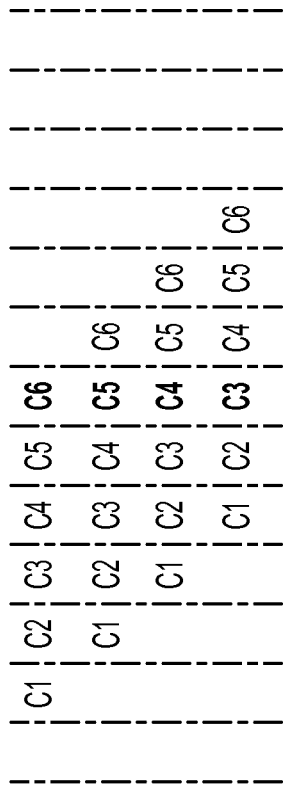
FIG. 4 is chart illustrating examples of pipe cycles for target stores versus pipe cycles for fetch request that can be implemented within embodiments of the present invention.

Now referring to FIGS. 3 and 4 also shown, according to this embodiment of the present invention, all of the pointer compares are performed at the third pipe cycle (C3) of the fetch request. As shown, at the third pipe cycle (C3) of the fetch request, valid stores of the plurality of stores are detected in pipe cycles C4, C5 and C6 of the plurality of stores ahead of the pipe cycle of the fetch request in FIG. 4. The core ID of the detected valid stores in C4, C5 or C6 is compared with the target core ID of the fetch request. The fetch request presents to the pipeline the core ID of the core that owns the line the fetch request is trying to fetch so that the appropriate store stack will present its compare pointer. It is also provided so that it can be used here in the store pointer detection. Next, the stack pointer of the detected valid stores in C4, C5 and C6 is compared with the pointer obtained earlier in C3 by the fetch request. According to an embodiment of the present invention, the store stack pointer is provided by the store pipe request to enable fetches to detect their target store and reset needs. It is also provided to be used by the in-pipeline pointer resolution logic to identify the target store ahead of the fetch in the pipeline. When it is determined that a detected valid store is the target store, the fetch request is processed without reporting store stack compare needs to the fetch controller.

Referring back to FIG. 2, if it is determined in operation 210 that the target store is ahead of the fetch request then the process continues to operation 215 where the fetch request is processed.

The present invention further discloses determining whether a memory access bit is on for a memory to be accessed by the fetch request. If the memory access bit is off, then the processing of the fetch request is disabled for that given pipe pass and data will not be fetched from the cache even if the in-line store stack pointer resolution prevents the fetch from having to set needs for stores. If the memory access bit is on, the fetch request may be processed during the same pipe pass. That is, if the memory access bit is off, the fetch request is able to re-enter the pipeline for cache access without having to set wait needs, but cannot fetch data from the cache during the existing pipe pass. But if the memory access bit is on and if the cache update/access cycle differences are minimal then the fetch request is able to access the cache during a same pipe pass.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The flowcharts can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Figure 5:
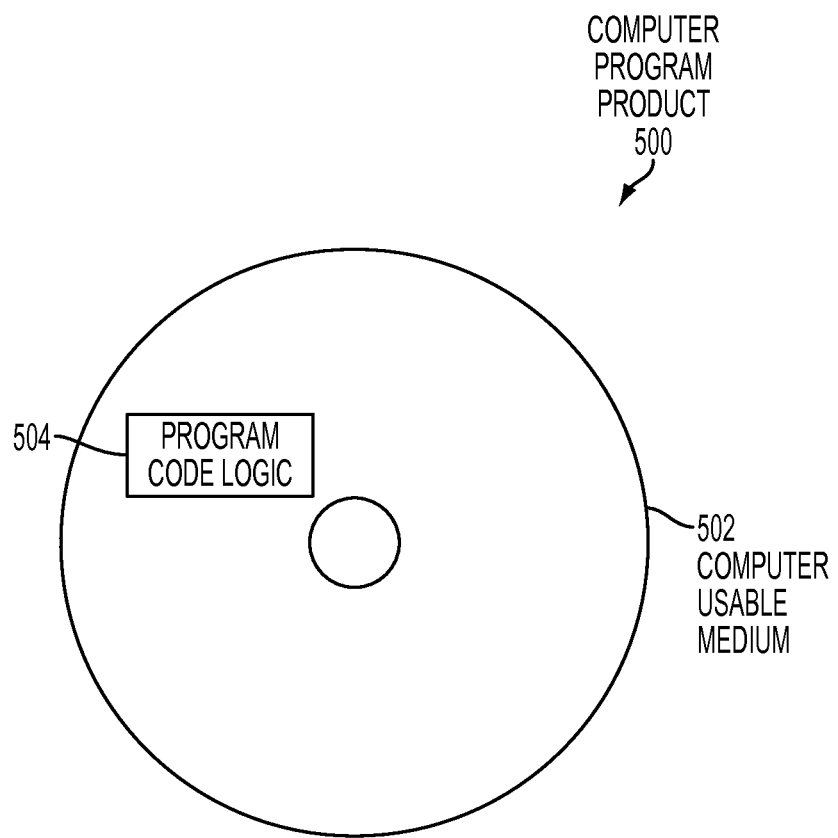
FIG. 5 is a diagram illustrating a computer program product that can be implemented within embodiments of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 500 as depicted in FIG. 5 on a computer usable medium 502 with computer program code logic 504 containing instructions embodied in tangible media as an article of manufacture. Exemplary articles of manufacture for computer usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method comprising:
   receiving a plurality of stores in a store queue, via a processor;
   comparing a fetch request against entries in the store queue to obtain a target store entry having a same memory address as the fetch request;
   determining that a target store associated with the obtained target store entry is ahead of the fetch request in a same pipeline;
   determining that a memory access bit is on, the memory access bit being on indicating that a memory access is requested by the fetch request;
   based on the target store being ahead of the fetch request and the memory access bit being off, disabling processing of the fetch request; and
   processing the fetch request during a same pipe pass based on determining that the target store is ahead of the fetch request and the memory access bit is on.

2. The computer-implemented method of claim 1, wherein determining that a target store associated with the obtained target store entry is ahead of the fetch request in a same pipeline comprises:
   comparing a pointer of the target store obtained by the fetch request at a pipe cycle of the fetch request to a pointer of the target store at a pipe cycle of the target store ahead of the pipe cycle of the fetch request, to determine whether the target store has completed.

3. The computer-implemented method of claim 2, further comprising:
   detecting valid stores of the plurality of stores in pipe cycles of the plurality of stores
   comparing a pointer of the detected valid stores with the pointer obtained by the fetch request; and
   based on determining that a detected valid store is the target store, processing the fetch request without reporting a need to wait for the target store.

4. The computer-implemented method of claim 3, further comprising:
   setting a wait need based on determining that the detected valid store does not match the target store; and
   waiting until a matching target store is detected in the same pipeline based on the wait need being set.

5. The computer-implemented method of claim 3, further comprising:
   comparing core IDs of the detected valid stores to a target core ID of the fetch request; and
   presenting to the same pipeline a core ID of a core that owns a cache line attempted to be accessed by the fetch request.

6. The computer-implemented method of claim 1, wherein the same pipeline is a cache pipeline.

7. The computer-implemented method of claim 6, wherein the cache pipeline is a level-3 cache pipeline.

8. The computer-implemented method of claim 1, further comprising:
   receiving the fetch request from a fetch queue.

9. The computer-implemented method of claim 1, wherein the store queue is processed in order.

10. A computer-implemented method comprising:
    receiving a plurality of stores in a store queue, via a processor;
    comparing a fetch request against entries in the store queue to obtain a target store entry having a same memory address as the fetch request and determining that a target store associated with the obtained target store entry is ahead of the fetch request in a same pipeline, comprising:
       detecting valid stores of the plurality of stores in pipe cycles of the plurality of stores ahead of a pipe cycle of the fetch request; and
       comparing a pointer of the detected valid stores with a pointer obtained by the fetch request; and
    processing the fetch request based on determining that the target store is ahead of the fetch request by:
       comparing a pointer of the target store obtained by the fetch request at the pipe cycle of the fetch request to a pointer of the target store at a pipe cycle of the target store ahead of the pipe cycle of the fetch request to determine whether the target store has completed, wherein processing the fetch request is performed without reporting a need to wait for the target store based on determining that a detected valid store is the target store;
       setting a wait need based on determining that the detected valid store does not match the target store; and
       waiting until a matching target store is detected in the same pipeline based on the wait need being set.

11. The computer-implemented method of claim 10, wherein the same pipeline is a cache pipeline.

12. The computer-implemented method of claim 11, wherein the cache pipeline is a level-3 cache pipeline.

13. The computer-implemented method of claim 10, further comprising:
receiving the fetch request from a fetch queue.

14. The computer-implemented method of claim 10, wherein the store queue is processed in order.

15. A computer-implemented method comprising:
receiving a plurality of stores in a store queue, via a processor;
comparing a fetch request against entries in the store queue to obtain a target store entry having a same memory address as the fetch request and determining that a target store associated with the obtained target store entry is ahead of the fetch request in a same pipeline, comprising:
detecting valid stores of the plurality of stores in pipe cycles of the plurality of stores ahead of a pipe cycle of the fetch request; and
comparing a pointer of the detected valid stores with a pointer obtained by the fetch request; and
processing the fetch request based on determining that the target store is ahead of the fetch request by:
comparing a pointer of the target store obtained by the fetch request at the pipe cycle of the fetch request to a pointer of the target store at a pipe cycle of the target store ahead of the pipe cycle of the fetch request to determine whether the target store has completed, wherein processing the fetch request is performed without reporting a need to wait for the target store based on determining that a detected valid store is the target store;
comparing core IDs of the detected valid stores to a target core ID of the fetch request; and
presenting to the same pipeline a core ID of a core that owns a cache line attempted to be accessed by the fetch request.

16. The computer-implemented method of claim 15, wherein the same pipeline is a cache pipeline.

17. The computer-implemented method of claim 16, wherein the cache pipeline is a level-3 cache pipeline.

18. The computer-implemented method of claim 15, further comprising:
receiving the fetch request from a fetch queue.

19. The computer-implemented method of claim 15, wherein the store queue is processed in order.

* * * * *